(12) United States Patent
Wellbrock et al.

(10) Patent No.: US 10,491,296 B1
(45) Date of Patent: Nov. 26, 2019

(54) SYSTEMS AND METHODS FOR PASSIVE OPTICAL NETWORK INTEGRATED TOOL

(71) Applicant: Verizon Patent and Licensing Inc., Arlington, VA (US)

(72) Inventors: Glenn A. Wellbrock, Wylie, TX (US); Tiejun J. Xia, Richardson, TX (US); Christina M. Bassett, New Ipswich, NH (US); Daniel L. Peterson, Jr., Sachse, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/129,505

(22) Filed: Sep. 12, 2018

(51) Int. Cl.
*H04B 10/25* (2013.01)
*H04B 10/079* (2013.01)
*H04B 10/27* (2013.01)

(52) U.S. Cl.
CPC ....... *H04B 10/07955* (2013.01); *H04B 10/25* (2013.01); *H04B 10/27* (2013.01)

(58) Field of Classification Search
None
See application file for complete search history.

(56) References Cited

U.S. PATENT DOCUMENTS

| | | | | |
|---|---|---|---|---|
| 6,915,076 B1* | 7/2005 | Mittal | ............. | H04B 10/07955 375/317 |
| 7,612,936 B2* | 11/2009 | Usui | ..................... | H01S 3/1301 359/337.12 |
| 2003/0231297 A1* | 12/2003 | Endo | .................. | G01M 11/3145 356/73.1 |
| 2009/0204009 A1* | 8/2009 | Powers | ................ | A61B 5/0075 600/476 |
| 2010/0092171 A1* | 4/2010 | Conner | ................ | G02B 6/4452 398/49 |
| 2013/0121374 A1* | 5/2013 | Wuest | .................... | G01K 11/32 374/161 |
| 2013/0249297 A1* | 9/2013 | Takehara | .................. | H02J 1/00 307/71 |
| 2014/0146385 A1* | 5/2014 | Takeyama | ........... | H01S 3/06754 359/334 |
| 2016/0033335 A1* | 2/2016 | Yamada | ................ | G01J 5/0896 250/205 |
| 2017/0170624 A1* | 6/2017 | Yoita | ................... | H01S 3/06754 |

* cited by examiner

*Primary Examiner* — Tanya T Motsinger

(57) ABSTRACT

A passive optical network ("PON") integrated tool may be a single device with which to (i) test and measure optical power levels on active fiber links that transfer signaling between PON devices without interfering with the signaling, (ii) test and measure reflectance and signal loss on inactive fiber links on which there is no signaling, (iii) illuminate fiber with visible light for visual integrity verification, and/or (iv) inspect fiber optic cable connectors for minute abnormalities. The PON integrated tool may include pass-through connection adapters with a tap to provide signaling from connected fiber to one or more detectors that measure signaling characteristics at different wavelengths for different PON channels. The PON integrated tool may include other connection adapters for fiber inspection, emission of visible laser light, and/or emission of pulses of light to the connected fiber in order to measure reflectance and signal loss.

20 Claims, 9 Drawing Sheets

US 10,491,296 B1

SYSTEMS AND METHODS FOR PASSIVE OPTICAL NETWORK INTEGRATED TOOL

BACKGROUND

A passive optical network ("PON") may be a point-to-multipoint fiber to the premises network architecture. The PON may use unpowered optical splitters at one or more fiber distribution hubs ("FDHs") to enable a single optical fiber to serve multiple premises. Errors may occur at different points within the PON. Technicians may be sent to determine the location of the errors, and to correct the errors in order to restore service to affected end users.

DETAILED DESCRIPTION OF PREFERRED EMBODIMENTS

The following detailed description refers to the accompanying drawings. The same reference numbers in different drawings may identify the same or similar elements.

Systems and/or methods, as described herein, may provide a passive optical network ("PON") integrated tool for testing newly installed and/or inactive fiber optic links, and/or testing active fiber optic links transferring signaling between PON devices. In particular, the PON integrated tool may be used to detect and diagnose errors on newly installed fiber optic links of a PON before signaling (e.g., pulses of light used to transmit data) passes through the links, and/or on established fiber optic links of a PON that actively transfer signaling, according to Broadband PON ("BPON"), Gigabit PON ("GPON"), Next-Generation PON 2 ("NG-PON2"), and/or other PON standards, without interfering with the transferred signaling.

The PON integrated tool may be a single portable device from which a multitude of PON tests may be performed. Examples of PON tests that can be performed using the PON integrated tool include measuring optical power levels, locating and measuring reflectance and loss, checking fiber fault visually with visible light, inspecting fiber optic cable connectors, and/or performing other error detection, signal diagnosis, and/or integrity verification. In some embodiments, the PON integrated tool may adapt to different wavelengths, frequencies, power levels, and/or other signaling characteristics of different PON standards including BPON, GPON, NG-PON2, and/or other PON standards. Additionally, the PON integrated tool may be used across a PON to perform tests at optical network terminals ("OLTs"), fiber distribution hubs ("FDHs"), fiber distribution terminals ("FDTs"), and/or other network locations of a PON.

Figure 1:
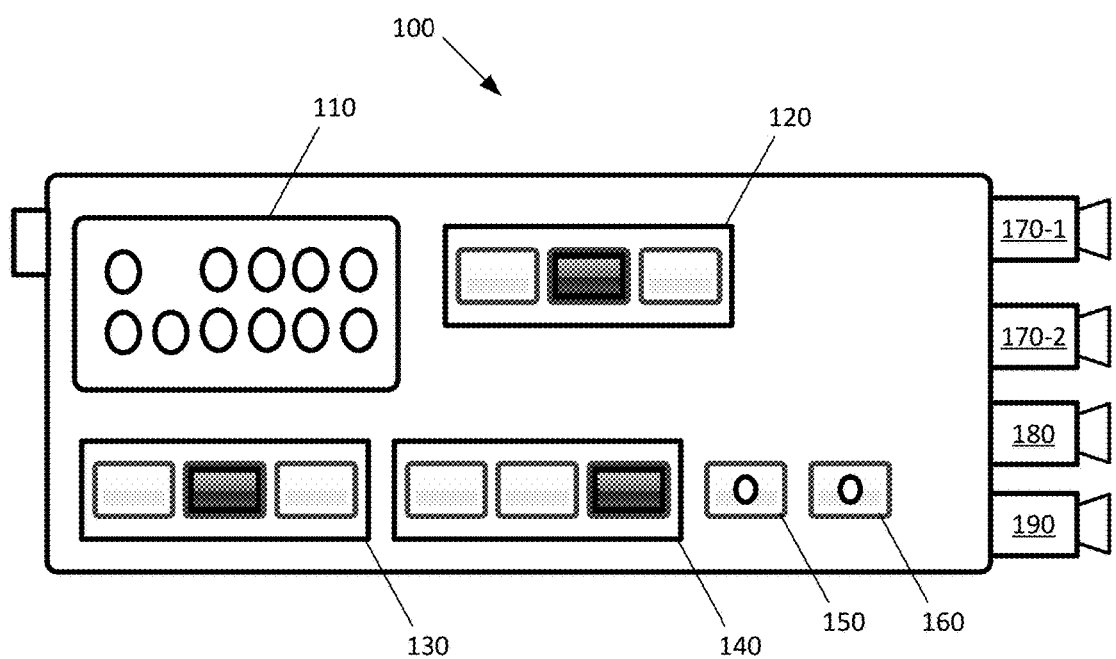
FIG. 1 illustrates a passive optical network ("PON") integrated tool in accordance with some embodiments described herein.

FIG. 1 illustrates example PON integrated tool 100 in accordance with some embodiments described herein. PON integrated tool 100 may include display interface 110, PON selection interface 120, Optical Time-Domain Reflectometer ("OTDR") interface 130, test location selection interface 140, visual light test control 150, fiber inspection test control 160, pass-through connection adapters 170-1 and 170-2 (herein sometimes collectively referred to as "adapters 170" or individually as "adapter 170"), fiber inspection adapter 180, OTDR and/or visual light adapter 190. In some embodiments, PON integrated tool 100 may include other displays, input interfaces, connection adapters, and/or other elements in addition to or instead of those illustrated by FIG. 1.

Display interface 110 may include a set of lights, light emitting diodes ("LEDs"), and/or some other type of visual indicator. In some embodiments, each light (or LED or other type of visual indicator), of the set of lights, may indicate a status of a different test or measurement. In some embodiments, each light may indicate a power measurement result that is obtained for a different upstream or downstream channel (e.g., wavelength and/or frequency) of a different PON standard (e.g., BPON, GPON, NG-PON2, etc.). For instance, display interface 110 may include a different light for testing the optical power level of a single upstream channel of the BPON/GPON standard, each of four upstream channels of the NG-PON2 standard, a single downstream channel of the BPON/GPON standard, each of four downstream channels of the NG-PON2 standard, a downstream channel for radio frequency ("RF") video transmission, and/or other upstream or downstream channels. Each light of display interface 110 may illuminate to one or more different colors. Each color may identify whether a corresponding test has passed or failed, or whether a corresponding measurement is within or outside a desired range.

In some embodiments, display interface 110 may be a graphical display that can present the set of lights and/or any other image or graphic. For instance, display interface 110 may provide textual and/or graphical output. For instance, display interface 110 may present different channel identifiers (e.g., "BPON downstream channel") and a test result or condition with each identifier. In some such embodiments, display interface 110 may be used to present results for different tests. For instance, display interface 110 may output text that includes a test identifier (e.g., "OTDR test", "BPON downstream optical power level test") and a test result or condition. In some embodiments, the textual and/or graphical output, provided via display interface 110, may include measured and/or raw values (e.g., scores in a normalized range) in addition to or instead of summarized results (e.g., successful test, error detect, and/or test values outside, above, or below acceptable ranges) that are based on the measured and/or raw values.

As noted above, PON integrated tool 100 may be used to test signaling of BPON, GPON, NG-PON2, and/or other PON standards. Each PON standard may specify different signaling characteristics for upstream and downstream communications (e.g., wavelengths, frequencies, power levels, transmission speeds, etc.). PON selection interface 120 may provide one or more inputs (e.g., buttons, touchscreen inputs, and/or other input techniques) for configuring PON integrated tool 100 to test the signaling characteristics of different supported PON standards. For instance, PON selection interface 120 may be used to configure PON integrated tool 100 with acceptable ranges for signaling of a PON standard. PON integrated tool 100 may then measure characteristics of signaling passing through fiber optic cables that are connected to adapters 170-1 and 170-2, and may present, via display interface 110, a simplified readout as to whether the measured signaling characteristics fall within or outside the acceptable ranges for signaling of the PON standard selected using PON selection interface 120. In some embodiments, PON selection interface 120 may also be used to configure signaling characteristics for signaling emitted by PON integrated tool 100 when performing OTDR testing and/or measuring signal loss over an inactive PON or newly established fiber links.

OTDR interface 130 may include one or more indicators for identifying OTDR test results at different distances from PON integrated tool 100. In some embodiments, each indicator of OTDR interface 130 may be used to configure or modify the OTDR testing. For instance, each indicator may be pressed or otherwise selected in order to configure the OTDR test range, test pulse width, test pulse width wavelength, and/or other OTDR test parameters.

Test location selection interface 140 may include one or more inputs for selecting different acceptable test ranges or results and/or signaling characteristics that are associated with testing from different PON locations. For instance, test location selection interface 140 may be used to configure an optical power level test with a first set of acceptable optical power levels when testing upstream signaling at an FDH, and a different second set of acceptable optical power levels when testing upstream signaling at an FDT. The different sets of acceptable optical power levels may account for signal attenuation that occurs as a result of splitting the light associated with the signaling over different fiber optic cables.

In some embodiments, PON integrated tool 100 may be remotely configured by an external device using wireless messaging. In some such embodiments, PON selection interface 120, OTDR interface 130, and/or test location selection interface 140 may visually present (e.g., via illumination of one or more indicators) the test parameters, and/or test results after running a remotely configured test.

Visual light test control 150 may include an input for turning on and off visible laser light at OTDR and/or visual light adapter 190. When visual light test control 150 is activated, visible laser light is emitted through a fiber optic cable that is connected to visual light adapter 190. Visual light test control 150 and the visible light test may be used to test and verify physical integrity of the connected fiber optic cable, as described herein.

Fiber inspection test control 160 may include an input for initiating a fiber inspection test of a fiber optic cable connector and/or end that is connected to fiber inspection adapter 180. The fiber inspection test may detect abnormalities (e.g., scratches, defects, damage, dirt, contaminates, residue, and/or other issues on the connector or end surface) that may disrupt signaling transmission.

Adapters 170-1 and 170-2 allow PON integrated tool 100 to operate as a pass-through device on an operational PON, and to test the operational PON without interrupting signaling being exchanged between PON devices (e.g., FDH, FDT, and ONTs) on opposite ends of the fiber optic cables that are connected to adapters 170-1 and 170-2. Adapters 170, fiber inspection adapter 180, and/or OTDR and/or visual light adapter 190 may support Multi-fiber Push On ("MPO")/MTP®, SubMiniature ("SM"), Subscriber Connector ("SC"), and/or other fiber optic cable connectors. Adapters 170, fiber inspection adapter 180, and/or OTDR and/or visual light adapter 190 may each include a dust cap. Each dust cap may be removable, and may be attached to protect fiber connectors and/or adapters 170, 180, and/or 190 from contaminates and/or damage.

Figure 2:
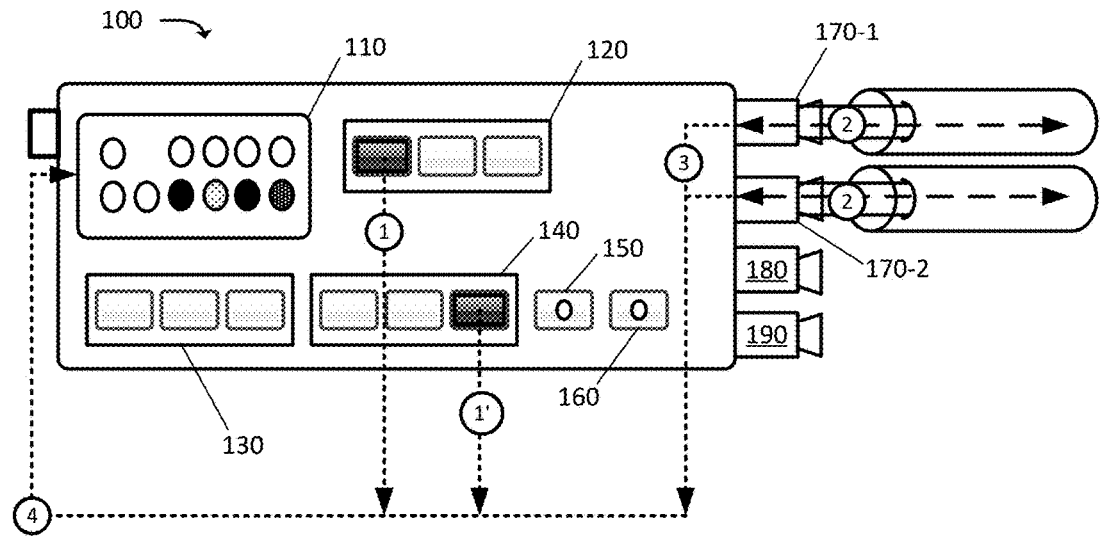
FIG. 2 illustrates an example of using the PON integrated tool to test downstream signaling of a PON in accordance with some embodiments described herein.

FIG. 2 illustrates an example of using PON integrated tool 100 to test downstream signaling of a PON in accordance with some embodiments described herein. In this figure, a user may configure PON integrated tool 100 to test signaling characteristics on each of four downstream channels of a NG-PON2.

The user may configure the test based on inputs provided via PON selection interface 120 and test location selection interface 140, and by connecting fiber optic cables to pass-through connector adapters 170-1 and 170-2. In this figure, the user may select (at 1) an input from PON selection interface 120 to configure PON integrated tool 100 for NG-PON2 testing. In some embodiments, PON selection interface 120 may have additional inputs to configure PON integrated tool 100 for GPON testing and/or BPON testing. The user may also select (at 1') an input from test location selection interface 140 to specify performing the NG-PON2 testing at or from an ONT. Based on the selections and the NG-PON2 standard, PON integrated tool 100 may determine acceptable ranges of wavelengths, frequencies, power, and/or other characteristics for signaling passing on each of the NG-PON2 four downstream channels.

PON integrated tool 100 may receive (at 2) signaling passing over the fiber optic cables connected to adapters 170-1 and 170-2, and may measure (at 3) the wavelengths, frequencies, power, and/or other characteristics for the downstream signaling. Rather than present wavelength, frequency, power, and/or other values to the user for the user decipher, PON integrated tool 100, via software, may determine whether the measured values fall within the acceptable ranges of the NG-PON2 standard for each of the four NG-PON2 downstream channels.

PON integrated tool 100 may then illuminate (at 4) an indicator from display interface 110 corresponding to each downstream channel to indicate the status of each NG-PON2 downstream channel. For instance, PON integrated tool 100 may illuminate a first indicator and a third indicator from display interface 110 with a first color to indicate that measured wavelengths, frequencies, power, and/or other characteristics for signaling passing on the first and third downstream channels of the NG-PON2 were within acceptable ranges. PON integrated tool 100 may illuminate a second indicator from display interface 110 with a different second color to indicate a first error when one or more of the measured signaling characteristics for the downstream signaling on the second channel of the NG-PON2 are greater than the acceptable ranges. PON integrated tool 100 may illuminate a fourth indicator from display interface 110 with a third color to indicate a different second error when one or more of the measured signaling characteristics for the downstream signaling on the fourth channel of the NG-PON2 are lower than the acceptable ranges. For instance, a mathematical formula may be applied to the obtained (at 3) measurements and/or values in order to produce a set of normalized scores. The normalized scores can be compared against one or more thresholds (e.g., a maximum value and a minimum value from the acceptable ranges). If the normalized scores are within the thresholds, then the test has successfully passed and an indicator may be illuminated with a color (e.g., green) indicating the successfully passed test. If the normalized scores are near the thresholds, then the indicators may be illuminated with a color (e.g., yellow) indicating a warning. If the normalized scores are outside the thresholds, then the indicator may be illuminated with a color (e.g., red) indicating the errors. In some embodiments, display interface 110 may include a graphical display that presents a textual identifier for each NG-PON2 downstream channel with a corresponding status (e.g., pass, warning, fail, above range, below range, etc.). In some embodiments, display interface 110 may present a test identifier with an obtained measurement (e.g., "mean optical power level for BPON upstream=1 dBm") and/or the test identifier with a detailed test condition (e.g., "optical power level exceeds maximum threshold by 0.5 dB").

In some embodiments, PON integrated tool 100 may simultaneously test the signaling characteristics for signaling on each of the four NG-PON2 upstream channels, and may present status (e.g., measured characteristics within acceptable ranges, greater than the acceptable ranges, less than the acceptable ranges, etc.) for each upstream channel by illuminating each of four lights, in display interface 110 that are above the four lights for the downstream channels, with the coloring corresponding to the detected status.

Figure 3:
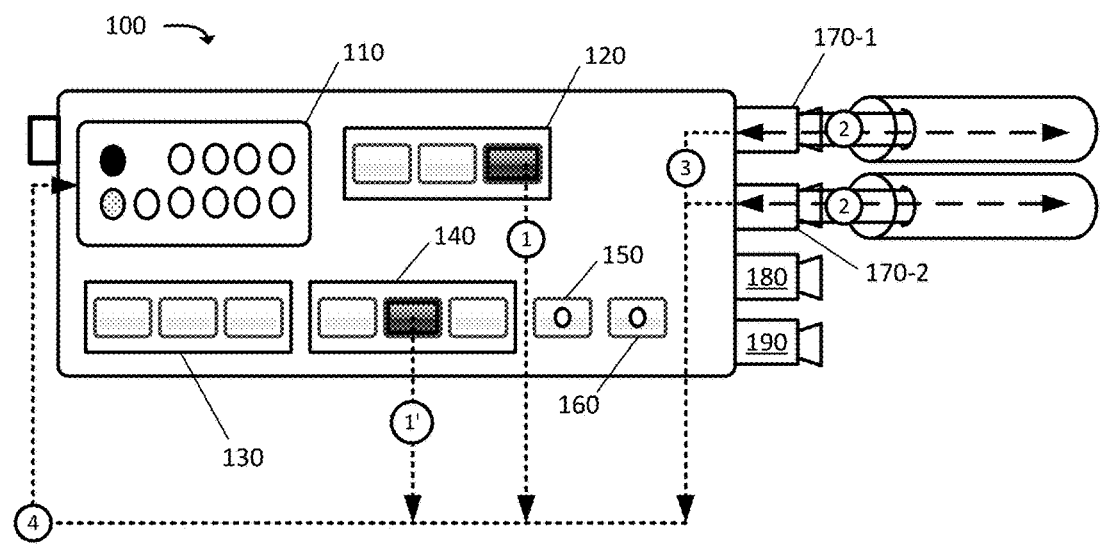
FIG. 3 illustrates an example of using the PON integrated tool to test upstream and downstream signaling of a PON in accordance with some embodiments described herein.

FIG. 3 illustrates an example of using PON integrated tool 100 to test upstream and downstream signaling of a PON in accordance with some embodiments described herein. In FIG. 3, the user may select (at 1 and 1') different inputs from PON selection interface 120 and test location selection interface 140. The inputs configure PON integrated tool 100 for BPON testing at an FDT. Based on the provided input, the PON integrated tool 100 may determine acceptable ranges of signaling characteristics for signaling passing on the upstream channel and the downstream channel of the BPON.

PON integrated tool 100 may receive (at 2) signaling from the fiber optic cables that are connected at adapters 170-1 and 170-2. PON integrated tool 100 may measure (at 3) various characteristics of the upstream and downstream signaling. PON integrated tool 100 may then illuminate (at 4) two different lights or provide other output via display interface 110 to identify whether the measured signaling characteristics fall within, above, or below different acceptable ranges for upstream BPON signaling and downstream BPON signaling.

Figure 4:
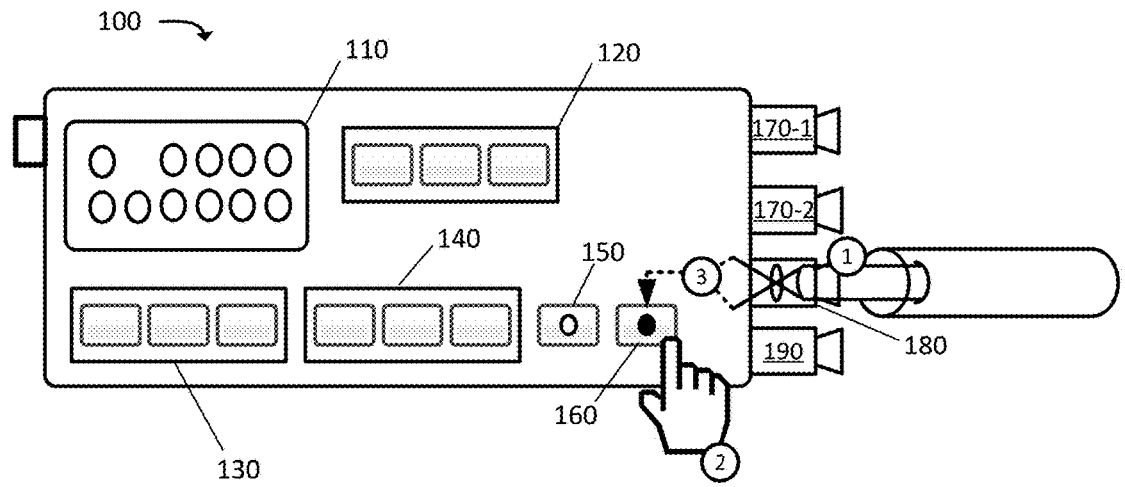
FIG. 4 illustrates an example of using the PON integrated tool to perform a fiber inspection test in accordance with some embodiments described herein.

FIG. 4 illustrates an example of using PON integrated tool 100 to perform a fiber inspection test in accordance with some embodiments described herein. The fiber inspection test may detect a scratch, defect, damage, dirt, contaminates, residue, and/or other abnormalities about the fiber optic cable connector and/or end that disrupt signaling transmission.

In FIG. 4, a user may connect (at 1) a fiber optic cable to fiber inspection adapter 180. The user may provide (at 2) input via fiber inspection test control 160 to initiate the fiber inspection test. Initiating the fiber inspection test may cause PON integrated tool 100 to inspect (at 3) the fiber optic cable connector and/or end for any abnormalities that disrupt signaling transmission. In some embodiments, PON integration tool 100 may contain a probe having the resolution of a microscope, and may use to probe to magnify the fiber optic cable connector and/or end in order to detect the abnormalities that disrupt signal transmission.

PON integration tool 100 may illuminate (at 3) fiber inspection test control 160 or a corresponding indicator a first color to indicate that no abnormalities were detected during the fiber inspection test. PON integration tool 100 may illuminate (at 3) fiber inspection test control 160 or the corresponding indicator one or more colors, different than the first color, to indicate different abnormalities that may have been detected during the fiber inspection test.

Figure 7:
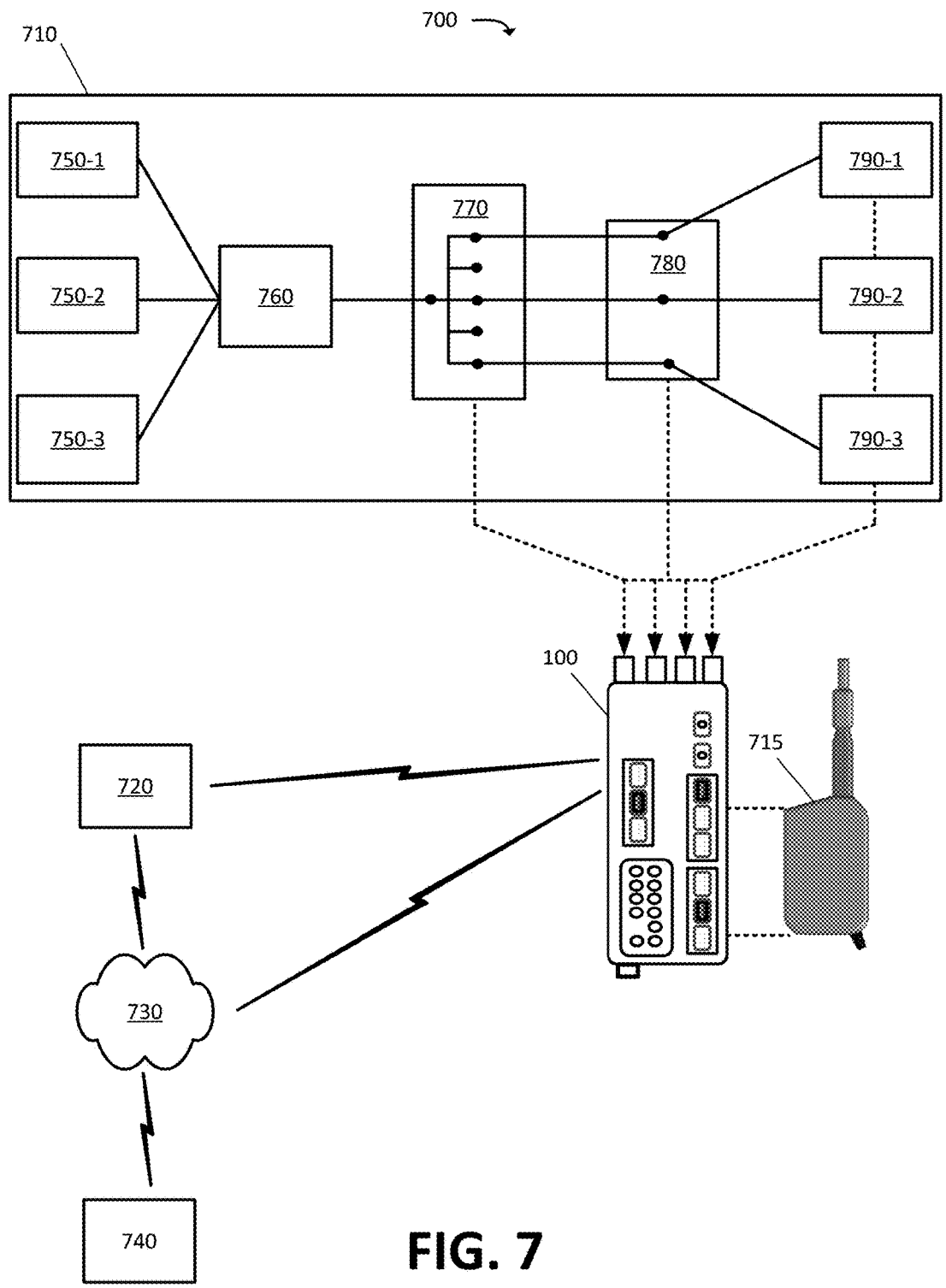
FIG. 7 illustrates an example environment, in which one or more embodiments, described herein, may be implemented.

In some embodiments and as shown with reference to FIG. 7, PON integration tool 100 may include a fiber cleaner. The fiber cleaner may be an attachment that couples to an exterior of PON integration tool 100 via one or more flexible clips that retain the fiber cleaner about the exterior of PON integration tool 100. The fiber cleaner may have an elongated tip that is aligned with fiber inspection adapter 180. A user may connect the fiber optic cable with detected abnormalities to the fiber cleaner, and provide input to activate the fiber cleaner. The fiber cleaner may include a cleaning strand that removes contaminates, residue, and/or other abnormalities from the fiber optic cable connector or end.

Figure 5:
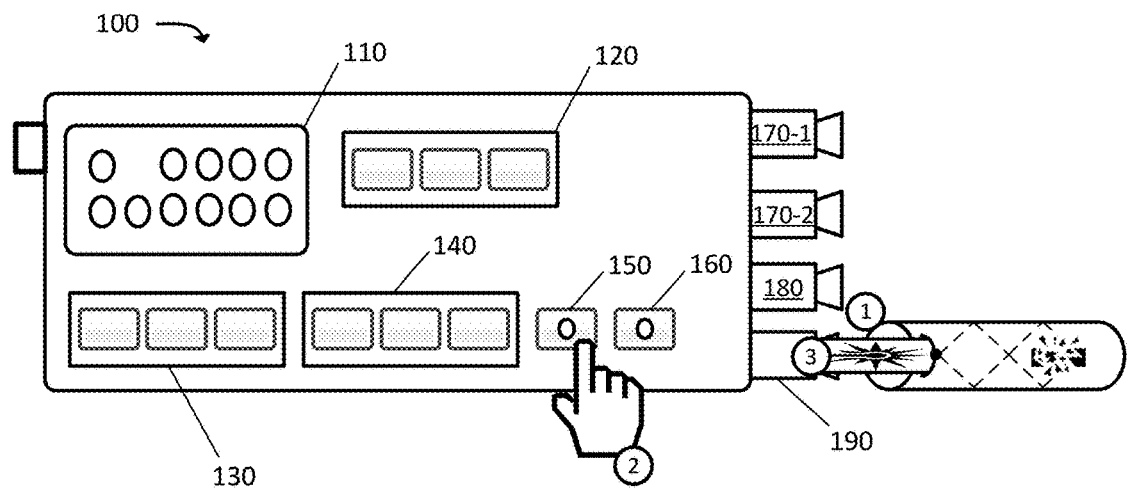
FIG. 5 illustrates an example of using the PON integrated tool to perform a visual light inspection test in accordance with some embodiments described herein.

FIG. 5 illustrates an example of using PON integrated tool 100 to perform a visual light inspection test in accordance with some embodiments described herein. The visible light test may be used to test and verify physical integrity of a fiber optic cable.

In FIG. 5, a user may connect (at 1) a fiber optic cable to OTDR and/or visual light adapter 190. The user may provide (at 2) input via visual light test control 150. The input may initiate the visual light inspection test.

In response to activating the visual light inspection test via input provided (at 2) to visual light test control 150, PON integration tool may emit (at 3) visible laser light through the fiber optic cable that is connected (at 1) to OTDR and/or visual light adapter 190. In some embodiments, the visible laser light may be red, blue, or another color within the visible color spectrum, whereas BPON, GPON, NG-PON2, and/or other PON signaling may use wavelengths (e.g., 1310 nanometers ("nm") to 1610 nm) within the infrared light spectrum that are not visible to the naked human eye.

The fiber optic cable will illuminate as the visible laser light reflects within the fiber cable. The laser light will be blocked at any point along the fiber optic cable where there is a break or other discontinuity in the cable, and the fiber optic cable will not be illuminated past any such break or other discontinuity. A user can therefore visually verify the physical integrity of the fiber optic cable based on the illumination of the fiber optic cable.

Figure 6:
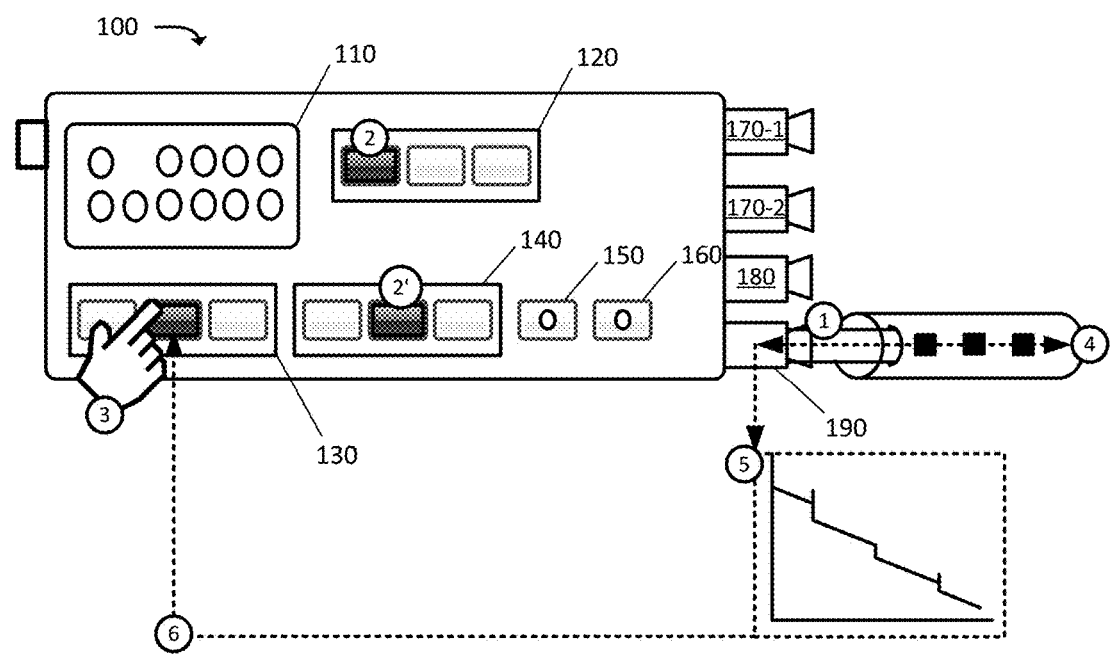
FIG. 6 illustrates an example of using the PON integrated tool to perform an Optical Time-Domain Reflectometer ("OTDR") test in accordance with some embodiments described herein.

FIG. 6 illustrates an example of using PON integrated tool 100 to perform an OTDR test in accordance with some embodiments described herein. OTDR testing may be used to test the performance of newly installed fiber links, and to detect problems that may exist in the newly installed fiber links prior to the fiber links becoming operational (e.g., being used to transfer signaling carrying customer or service provider data between PON devices). Specifically, OTDR testing may measure optical power in decibels ("dB") versus the length of the fiber optic cable, and may detect fiber attenuation, uniformity, signal losses, reflectance, and other properties of the fiber optic cable based on the measurements.

In FIG. 6, a user may connect (at 1) a fiber optic cable to OTDR and/or visual light adapter 190. The user may provide (at 2) input via PON selection interface 120 to configure PON integrated tool 100 for OTDR testing. For instance, the user may configure, via PON selection interface 120, the OTDR test to be conducted using signaling characteristics of a particular PON standard (e.g., wavelength, frequency, power, and/or other characteristics specified for the BPON, GPON, and/or NG-PON2 standards). The user may also provide (at 2') input via test location selection interface 140 to specify performing the OTDR testing from a specific network location, and to further configure the signaling that is used for the OTDR testing. In some embodiments, the OTDR testing can be configured and performed without user interaction with PON selection interface 120 and/or test location selection interface 140. In some such embodiments, PON integrated tool 100 may use the same signaling or cycle through the same set of signaling for OTDR testing of different fiber links of different PONs. In some embodiments, the user may use an external device to remotely configure PON integrated tool 100 for OTDR testing.

In some embodiments, OTDR interface 130 may provide different inputs for configuring an OTDR test. The different inputs associated with OTDR interface 130 may be used to configure the OTDR test range, test pulse width, test pulse width wavelength, and/or other OTDR test parameters. For instance, PON integrated tool 100 may measure signal loss at a first distance from PON integrated tool 100 in response to selection of first input from the OTDR interface 130, and PON integrated tool 100 may measure signal loss at a second distance from PON integrated tool 100 in response to selection of the OTDR interface 130 second input. Accordingly, the user may provide (at 3) input via OTDR interface 130 to configure the OTDR test. In some embodiments, the user input provided (at 3) via OTDR interface 130 may simply imitate the OTDR testing with PON integrated tool 100 performing multiple OTDR tests with different ranges, pulse widths, pulse width wavelengths, and/or other test parameters.

In response to activating the OTDR test via input provided (at 3) to OTDR interface 130 and/or input provided (at 2 and 2') to PON selection interface 120 and test location selection interface 140, PON integration tool may emit (at 4) one or more pulses of light from OTDR and/or visual light adapter 190, and for each pulse, may measure the light scattering through the connected fiber optic cable and coming back through OTDR and/or visual light adapter 190.

By modifying the speed, width, width wavelength, and/or other OTDR parameters for the emitted pulses, PON integrated tool 100 may correlate the detected backscattered light to a location in the fiber, and the amount or measured backscattered light that is detected at each location may identify points of signal loss. PON integrated tool 100, via software, may then identify (at 5) splice points, connector points, cable breaks, and/or other issues based on the different amounts of signal loss that occur at different points along the fiber.

OTDR interface 130 may include one or more indicators that may be associated with or separate from input controls of OTDR interface 130. As shown in FIG. 6, one or more of the indicators may illuminate (at 6) with one or more colors to identify different causes for different amounts of signal loss detected at different distances from PON integrated tool 100. For instance, a first indicator from OTDR interface 130 may illuminate with a first color in response to measuring no significant signal loss at a first distance from PON integrated tool 100 (e.g., 100 meters from PON integrated tool 100), and a second indicator from OTDR interface 130 may illuminate with a second color in response to measuring a large amount of signal loss that may indicate a break or fault a second distance from PON integrated tool 100 (e.g., 1 kilometer from PON integrated tool 100).

FIG. 7 illustrates an example environment 700, in which one or more embodiments, described herein, may be implemented. As shown in FIG. 7, environment 700 may include PON 710, PON integrated tool 100, fiber cleaner 715, user equipment ("UE") 720, network 730, and PON service provider 740. The quantity of devices and/or networks, illustrated in FIG. 7, is provided for explanatory purposes only. In practice, environment 700 may include additional devices and/or networks; fewer devices and/or networks; different devices and/or networks; or differently arranged devices and/or networks than illustrated in FIG. 7. For example, while not shown, environment 700 may include devices that facilitate or enable communication between various components shown in environment 700, such as fiber optic splicers, routers, network switches, gateways, etc. Alternatively, or additionally, one or more of the devices of environment 700 may perform one or more functions described as being performed by another one or more of the devices of environments 700. For instance, UE 720 functionality may be incorporated as part of PON integrated tool 100. Devices of environment 700 may interconnect with each other and/or other systems or devices via wired connections, wireless connections, or a combination of wired and wireless connections. In some implementations, one or more devices of environment 700 may be physically integrated in, and/or may be physically attached to, one or more other devices of environment 700. For instance, fiber cleaner 715 may integrated as part of or separately attached to PON integrated tool 100.

PON 710 may include optical line terminals ("OLTs") 750-1, 750-2, and 750-3 (herein sometimes collectively referred to as "OLTs 750" or individually as "OLT 750"), wave division multiplexer ("WDM") 760, one or more FDHs 770, one or more FDTs 780, and/or ONTs 790-1, 790-2, and 790-3 (herein sometimes collectively referred to as "ONTs 790" or individually as "ONT 790"). OLTs 750, WDM 760, FDHs 770, FDTs 780, and ONTs 790 may represent an example set of PON devices, and PON 710 may include additional or fewer devices based on numbers of end users, supported PON standards, distance, and/or other factors.

OLTs 750 may include devices that perform a layer 2 or layer 3 switching function for PON 710. For instance, OLTs 750 may connect to a packet-switched network (e.g., Internet), and may convert data packets received from the packet-switched network to signaling that can be passed to the different PON 710 devices. OLTs 750 may also perform a reverse conversion whereby signaling received from ONTs 790 and/or other PON 710 devices are converted to data packets for transfer across the packet-switched network. In addition to or instead of connecting to a packet-switched network, OLTs 750 may connect to and provide a switching function for a Voice over Internet Protocol ("VoIP") telecommunications network, a Public Switched Telephone Network ("PSTN"), a video streaming or delivery platform, and/or other voice and/or data systems and networks.

A first OLT 750-1 may produce BPON standard compliant signaling when PON 710 includes one or more BPON ONTs 790-1 that communicate via BPON signaling (e.g., 1310 nm for upstream communications at 155 megabits per second ("Mbps"), and 1490 nm for downstream communications at 622 Mbps). A second OLT 750-2 may produce GPON standard compliant signaling when PON 710 includes one or more GPON ONTs 790-2 that communicate via GPON signaling (e.g., 1310 nm for upstream communications at 1.244 gigabits per second ("Gbps"), and 1490.02 nm for downstream communications at 2.488 Gbps). A third OLT 750-3 may produce NG-PON2 standard compliant signaling when PON 710 includes one or more NG-PON2 ONTs 790-3 that communicate via NG-PON2 signaling (e.g., four channel upstream communication between 1532 nm and 1535 nm at 10 Gbps per channel, and four channel downstream communication between 1596 nm and 1599 nm at 10 Gbps per channel). PON 710 may include other OLTs when supporting other PON technologies and signaling.

WDM 760 may multiplex and demultiplex multiple wavelengths onto a single fiber optic cable, thereby allowing PON 710 to support signaling from two or more different PON standards. For instance, WDM 760 may enable PON 710 to support two or more BPON, GPON, NG-PON2, and/or other PON signaling, and simultaneous operation of two or more of BPON OLT 750-1, GPON OLT 750-2, and/or NG-PON2 750-3.

FDH 770 may provide a splice point at which a fiber optical cable from OLT 750 is split to two or more destinations (e.g., fiber optic cables, FDTs 780, ONTs 790, etc.). In some embodiments, FDH 770 may house one or more splicers or splitters that distribute downstream signaling from OLT 750 across two or more fiber optic cables, and that combine upstream signaling from two or more fiber optic cables to the fiber optic cable going back to OLT 750.

FDT 780 may provide a drop cable from PON 710 to an ONT 790 at a customer or end user premises. Each ONT 790 may include user-side equipment that converts downstream PON optical signals transmitted via fiber optic cable to electrical signals. ONT 790 may distribute the electrical signals to UEs that connect to ONT 790 via wired (e.g., twisted-pair copper wire, coaxial cable, optical fiber, etc.) or wireless (e.g., WiFi) connections. Each ONT 790 may also convert upstream electrical signals from the connected UEs to the PON optical signals that can be transmitted via fiber optic cable back to OLT 750.

As shown in FIG. 7, PON integrated tool 100 may connect to and test PON 710 from any of FDH 770, FDT 780, and ONT 790. Accordingly, PON integrated tool 100 can isolate errors that occur at different points throughout PON 710.

Fiber cleaner 715 may be attachment for PON integrated tool 100. Fiber cleaner 715 may supplement the fiber inspection test control 160 of PON integrated tool 100 by providing a device that can correct various abnormalities detected from a fiber inspection test completed by PON integrated tool 100. For instance, a user may initiate a fiber inspection test via fiber inspection test control 160, and the test may detect dirt, residue, and/or other abnormalities at the fiber optic cable connector or end. The fiber optic cable can be connected to fiber cleaner 715, and fiber cleaner 715 may clean the fiber optic cable connector or end by removing the dirt, residue, and/or other abnormalities. Attaching to or integrating fiber cleaner 715 as part of PON integration tool 100 allows a user to carry one less device when installing or maintaining PON 710.

In some embodiments, PON integrated tool 100 may wirelessly connect to UE 720 via Bluetooth or other wireless technology. PON integrated tool 100 may wirelessly connect to UE 720 in order to provide test measurements and/or results to UE 720. The test measurements and/or results provided to UE 720 may extend beyond the measurements and results that are presented by PON integrated tool 700. For instance, PON integrated tool 700 may provide UE 720 with detailed numerical values or granular data resulting from a completed or ongoing test. UE 720 may present the data through a display of UE 720. For instance, PON integrated tool 100 may identify one or more errors during a test of PON 710, and a user may access additional data for the test from UE 720 to diagnose or better understand the errors. In some embodiments, UE 720 may display a graph or numerical values associated with an OTDR test. The graph or numerical values may provide exact measures of signal loss or reflectance measured at different distances.

In some embodiments, UE 720 may transfer the test data obtained from PON integrated tool 100 to PON service provider 740. In some such embodiments, PON integrated tool 100 may have short-range wireless connectivity to connect and transfer data to UE 720 when UE 720 is nearby. UE 720 may include short-range wireless connectivity to connect to PON integrated tool 100, and may also include long-range wireless connectivity to connect and transfer data to PON service provider 740 via network 730. In some embodiments, UE 720 may use the wireless connectivity to PON integrated tool 100 in order to configure one or more tests using UE 720.

In some embodiments, PON integrated tool 100 may include long-range wireless connectivity in order to directly communicate with PON service provider 740 via network 730. In some such embodiments, PON service provider 740 may obtain test data directly from PON integrated tool 100, and may also communicate with PON integrated tool 100 in order to configure and initiate various tests when PON integrated tool 100 is brought to a test location by a user.

Network 730 may include one or more of a Local Area Network ("LAN"), a wireless telecommunications network, an IP-based Packet Data Network ("PDN"), a Wide Area Network ("WAN") such as the Internet, a private enterprise network, and/or one or more other networks. In some implementations, network 730 may be, or include, a cellular network, such as a Third Generation ("3G") network, a Fourth Generation ("4G") network, a Long-Term Evolution ("LTE") network, a Fifth Generation ("5G") network, etc. Network 730 may include, and/or may be connected to, one or more other networks, such as a public switched telephone network ("PSTN"), a Public Land Mobile Network ("PLMN"), and/or another network.

UE 720 may include any computation and communication device that is capable of communicating with one or more networks (e.g., network 730) or other devices via point-to-point connectivity (e.g., Bluetooth). For example, UE 720 may include a device that can access voice or calling services provided by a wireless service provider, and/or receive data, such as web pages (e.g., that include text content and/or image content), streaming audio and/or video content, and/or other content, via an Internet connection, communicates with PON integrated tool 100, and/or via some other delivery technique. In some implementations, UE 720 may be, or may include, a radiotelephone, a personal communications system ("PCS") terminal (e.g., a device that combines a cellular radiotelephone with data processing and data communications capabilities), a personal digital assistant ("PDA") (e.g., a device that includes a radiotelephone, a pager, etc.), a smart phone, a laptop computer, a tablet computer, a vehicle (e.g., automobile), Internet-of-Things ("IoT") device, a wearable device, and/or another type of computation and communication device.

PON service provider 740 may operate one or more server devices to monitor, configure, and/or control PON 710. PON service provider 740 may rely on one or more technicians (e.g., users) that service and resolve errors occurring within PON 710. The technicians may do away with having to carry a myriad of different tools to install or maintain PON 710 when equipped with PON integrated tool 100.

PON integrated tool 100 may process test measurements locally to provide simplified results to a user, via the color-coded indicators or other means, that indicate whether a test passed, failed, or experienced one or more conditions. The simplified output may increase user efficiency as the user can quickly determine if an error exists based on a colored indicator without manually having to correlate wavelength, frequency, power, reflectance, and/or other measurements or values to specific errors or conditions.

Figure 8:
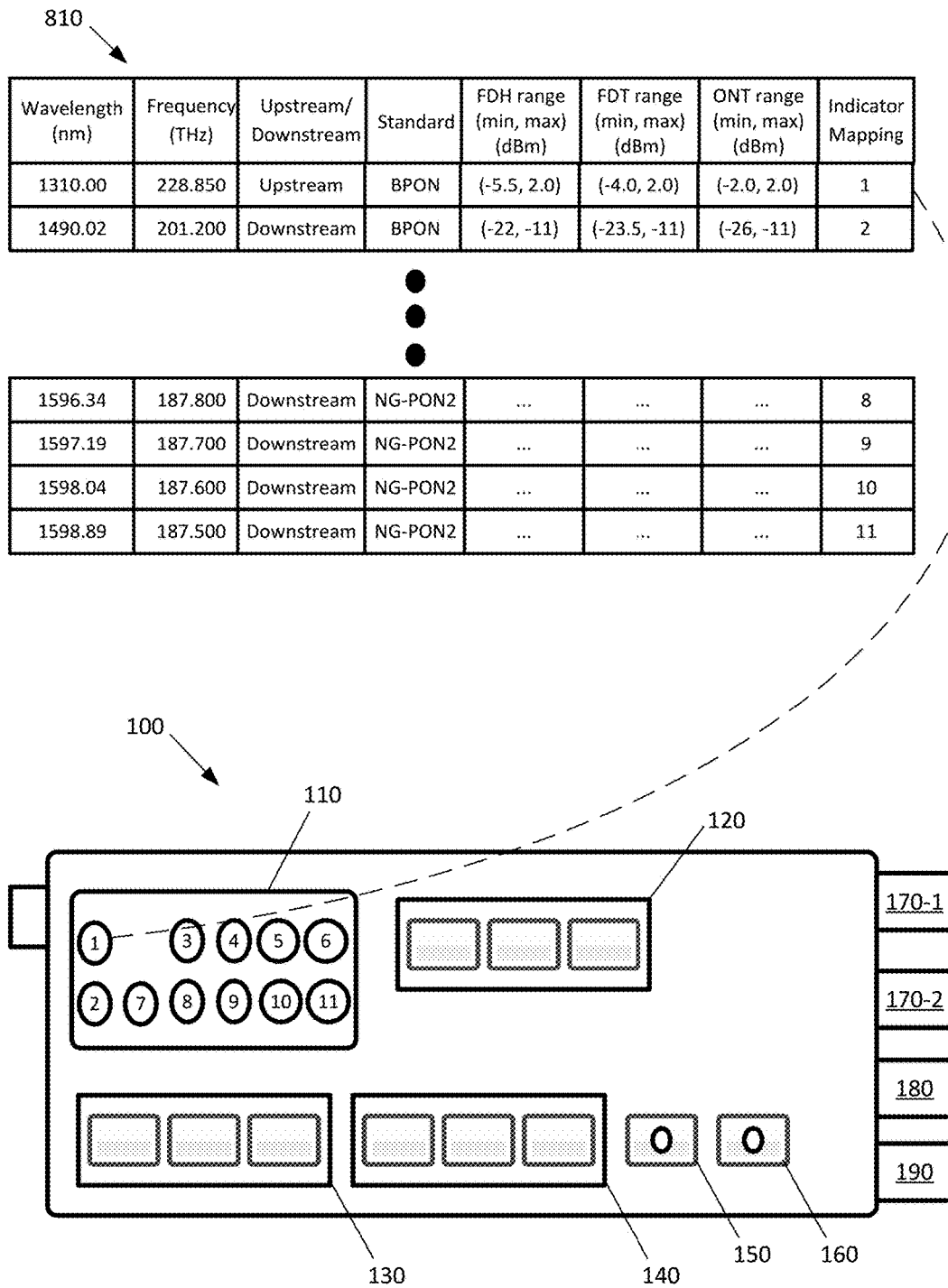
FIG. 8 illustrates an example mapping of test results to output provided by the PON integrated tool in accordance with some embodiments described herein.

FIG. 8 illustrates an example mapping of test results to output provided by PON integrated tool 100 in accordance with some embodiments described herein. As shown, PON integrated tool 100 may be configured with mapping table 810.

Mapping table 810 may include different rows that provide acceptable signaling characteristic ranges for different channels of different PON standards. In particular, the first row of mapping table 810 may provide acceptable power level ranges (an acceptable maximum and minimum power level in in decibel-milliwatts ("dBm")) for upstream BPON signaling at a PON FDH, FDT, and ONT, and the second row of mapping table 810 may provide acceptable power level ranges for downstream BPON signaling at a PON FDH, FDT, and ONT. In some embodiments, the acceptable power level ranges at different PON locations (e.g., FDH, FDT, and ONT) are not the same because of different operational parameters of the devices at those locations and/or other factors. The acceptable power level ranges illustrated in the first two row of mapping table 810 are provided for illustrative purposes, and may differ from acceptable power level ranges used for testing a PON. Mapping table 810 may include other rows for acceptable power level ranges for different changes of other PON standards. Mapping table 810 may also include acceptable ranges for other signaling characteristics (e.g., acceptable speed, wavelength, frequency, etc.).

PON integrated tool 100 may measure the power level of upstream signaling passing through fiber optic cables connected to pass-through connector adapters 170-1 and 170-2. Rather than present the measured results (e.g., one or more dBm values) to a user, and have the user decipher the meaning of the results, PON integrated tool 100 may use mapping table 810 to determine if the measured results fall within the acceptable ranges of the configured test (e.g., upstream BPON signaling).

If the measured results fall outside the acceptable ranges, PON integrated tool 100 may illuminate a first indicator from display interface 110 with a first color to identify an error, or to identify that the measured results are higher or lower than the acceptable ranges. If the measured results fall within the acceptable ranges, PON integrated tool 100 may illuminate the first indicator from display interface 110 with a second color to identify that the test is successful and that there is no detected issue with the measured upstream BPON signaling. In this figure, each row of mapping table 810 may correspond to a different PON test, and may map to a different indicator of display interface 110 that is used to display the result of that PON test. In some embodiments, PON integrated tool 100 may alternatively include a graphical display that presents an identifier identifying a test (e.g., testing power level of upstream BPON signaling), and a result of the test (e.g., pass, fail, measured results too high, measured results too low, and/or other conditions).

PON integrated tool 100 may be configured with other mapping tables for illuminating OTDR interface 130 according to measured OTDR test results, fiber inspection test control 160 according to results of a fiber inspection test, and/or other indicators of PON integrated tool 100 according to results of other tests. In this manner, PON integrated tool 100 may allow a user to quickly determine if a test passed, failed, or experienced one or more conditions. Should the user want to diagnose an error or other conditions resulting from a test, the user may access additional data for the test from UE 720.

Figure 9:
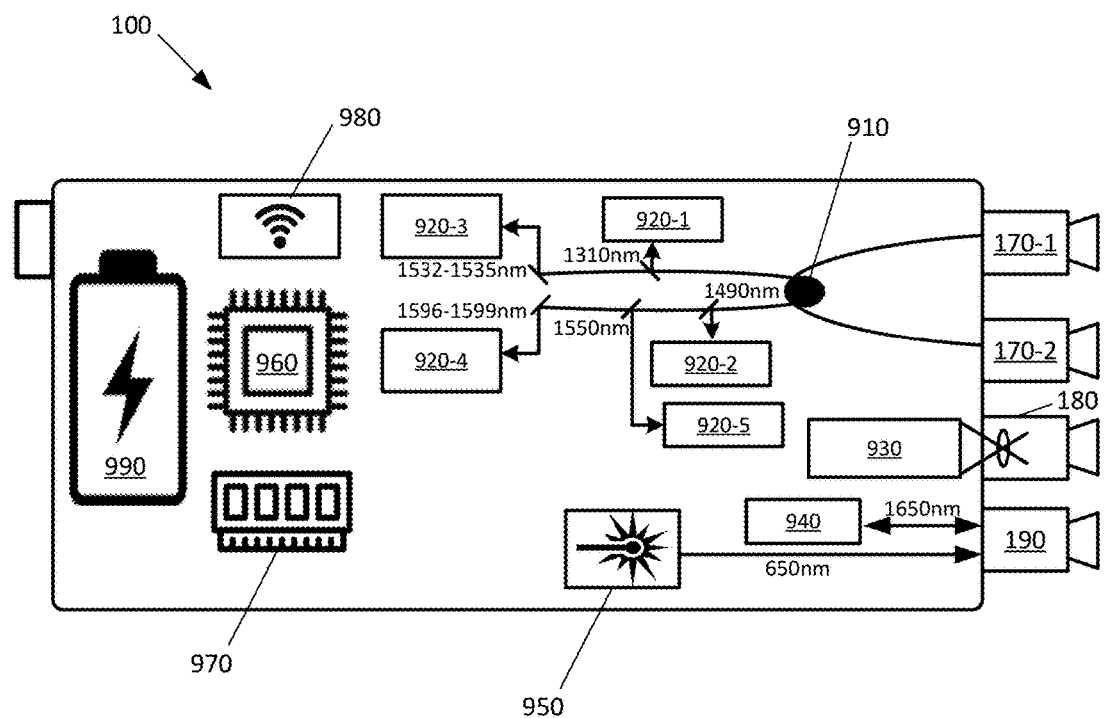
FIG. 9 illustrates example components of the PON integrated tool in accordance with some embodiments described herein.

FIG. 9 illustrates example components of PON integrated tool 100 in accordance with some embodiments described herein. PON integrated tool 100 may include a tap 910 between pass-through connector adapters 170-1 and 170-2, detectors 920-1, 920-2, 920-3, 920-4, and 920-5 (herein sometimes collectively referred to as "detectors 920" or individually as "detector 920"), fiber core inspector 930, OTDR 940, laser diode 950, processor 960, memory 970, wireless radio 980, and battery 990. PON integrated tool 100 may include other components in addition to or in lieu of the components illustrated in FIG. 9.

Tap 910 may allow detectors 920 to receive signaling from fiber optic cables connected to pass-through connector adapters 170-1 and 170-2 without interfering or distorting the signaling as it passes from one cable to another. Each detector 920 may detect and measure signaling for different PON channels (e.g., different wavelengths and/or frequencies). In particular, each detector 920 may detect and measure power levels, signal quality, and/or other characteristics of the signaling at or about a wavelength range and/or frequency range. For instance, detector 920-1 may detect signaling at or about 1310 nm for the BPON/GPON upstream channel, and detector 920-2 may detect and measure signaling at or about 1490 nm for the BPON/GPON downstream channel. Detectors 920-3 and 920-4 may be four channel detectors for detecting and measuring signaling at or about each of the four NG-PON2 upstream or downstream channels, and detector 920-5 may detect and measure signaling for video transmitted at 1535 nm. In some embodiments, PON integrated tool 100 may include fewer detectors 920 by integrating the signal detection and measurement capabilities of two or more detectors 920-1, 920-2, 920-3, 920-4, and 920-5 into a single circuit or component. In some embodiments, PON integrated tool 100 may include additional detectors 920 in order to detect and measure signaling of other PONs (e.g., Ethernet PON ("EPON")).

Fiber core inspector 930 may be connected to fiber inspection adapter 180 to allow for the inspection of the connector or tip of the fiber optic cable connected to fiber inspection adapter 180. Fiber core inspector 930 may include a circuit for imaging the fiber optic cable connector and/or tip, and/or inspecting the fiber optic cable connector and/or tip for abnormalities (e.g., scratch, defect, damage, dirt, contaminates, residue, etc.) that may disrupt signaling transmission.

OTDR 940 may be connected to OTDR and/or visual light adapter 190. OTDR 940 may generate pulses that are sent through a fiber optic cable connected to an exposed end of OTDR and/or visual light adapter 190. OTDR 940 may measure signal losses, attenuation, uniformity, and other characteristics at different parts of the fiber optic cable based on the reflectance of the of pulses.

Laser diode 950 may also be connected to OTDR and/or visual light adapter 190. Laser diode 950 may emit visible light to illuminate a fiber optic cable that is connected to an exposed end of OTDR and/or visual light adapter 190.

Processor 960 and memory 970 may configure various PON tests based on input from PON selection interface 120, Optical Time-Domain Reflectometer ("OTDR") interface 130, test location selection interface 140, visual light test control 150, fiber inspection test control 160, and/or other onboard or remote sources (e.g., wireless configuration by UE 720 and/or PON service provider 740). Processor 960 may also process the results obtained from one or more of components 920, 930, 940, 950, and/or other test components of PON integrated tool 100 in order to present simplified output to users. In some embodiments, memory 970 stores mapping table 810 and/or other mapping tables for other tests that processor 960 uses for processing and outputting test results.

Wireless radio 980 may provide wireless communication between PON integrated tool 100 and UE 720, PON service provider 740, and/or other devices. In some embodiments, wireless radio 980 may be a short-range radio for Bluetooth connectivity. In some embodiments, wireless radio 980 may be a long-range radio for communicating via WiFi, LTE, 5G, or other long-range networks. PON integrated tool 100 may use wireless radio 980 to transfer test results to another device (e.g., UE 720 and/or PON service provider 740). Wireless radio 980 may also be used to remotely configure and/or control PON integrated tool 100 in performing different tests.

PON integrated tool 100 may be a portable device by virtue of battery 990. Battery 990 may store and provide power to the components of PON integrated tool 100 so that testing can be done at remote sites without an external power source.

Figure 10:
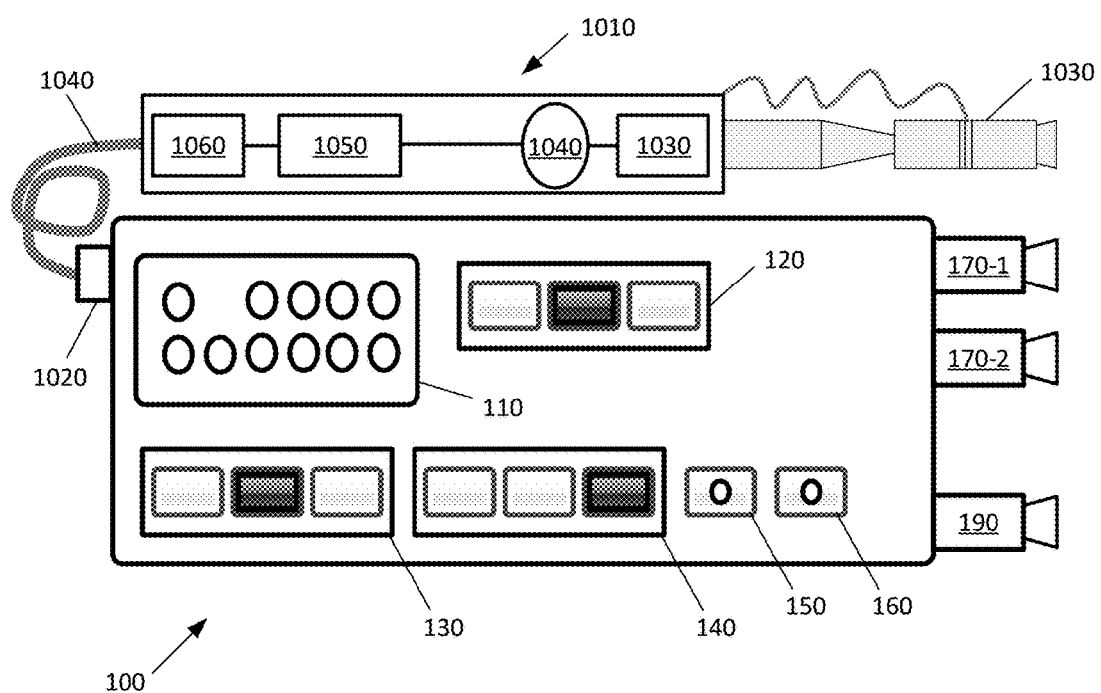
FIG. 10 illustrates an example attachment for the PON integrated tool in accordance with some embodiments described herein.

As noted above with reference to FIG. 7, PON integrated tool 100 may support various attachments. The attachments may provide optional features and/or functionality to PON integrated tool 100. FIG. 10 illustrates example attachment 1010 for PON integrated tool 100 in accordance with some embodiments described herein.

For instance, as shown in FIG. 10, PON integrated tool may lack fiber core inspector 930 and corresponding fiber inspection adapter 180 as integrated and/or onboard components. Instead, PON integrated tool 100 may support attachment 1010 via auxiliary port 1020. In some embodiments, attachment 1010 may be a fiber inspection probe that provides fiber inspection test functionality.

The fiber inspection probe attachment 1010 may include one or more of fiber core autofocusing module 1030, charge-coupled device ("CCD") 1040, processor 1050, and base unit interface 1060. Fiber core autofocusing module 1030 may position and/or keep the focal plane at the surface of the core of the fiber connector. CCD 1040 may obtain an image of the core and the surrounding area. Processor 1050 may determine, based on one or more obtained images, whether the fiber connector is contaminated and/or damaged. Interface 1060 may provide test results and/or other output to PON integrated tool 100. For instance, fiber inspection attachment 1010 may perform a fiber inspection test of a fiber optic cable connector and/or end that is connected to adaptor 130. Any detected abnormalities may be provided to PON integrated tool 100, and PON integrated tool 100 may adjust display interface 110 to output the test results. Interface 1060 may also receive input from PON integrated tool 100. For instance, a user may interact with PON integrated tool 100 and/or connected UE 720 in order to initiate a fiber inspection test via attachment 1010.

PON integrated tool 100 may support other attachments 1010 that perform other tests and/or functions. For instance, in response to detecting a contaminated core via attachment 1010, a user may replace attachment 1010 with fiber cleaner 715, and use fiber cleaner 715 to clean the core.

Attachment 1010 may include removable adaptor 1070 and plug 1080. Adaptor 1070 may be swappable to allow attachment 1010 to support different fiber connectors. Plug 1080 may be inserted into auxiliary port 1020 in order to provide a data channel for interface 1060 to exchange data with PON integrated tool 100. Auxiliary port 1020 may also provide power to attachment 1010 via battery 990. In some embodiments, attachment 1010 may have its own power source.

Figure 11:
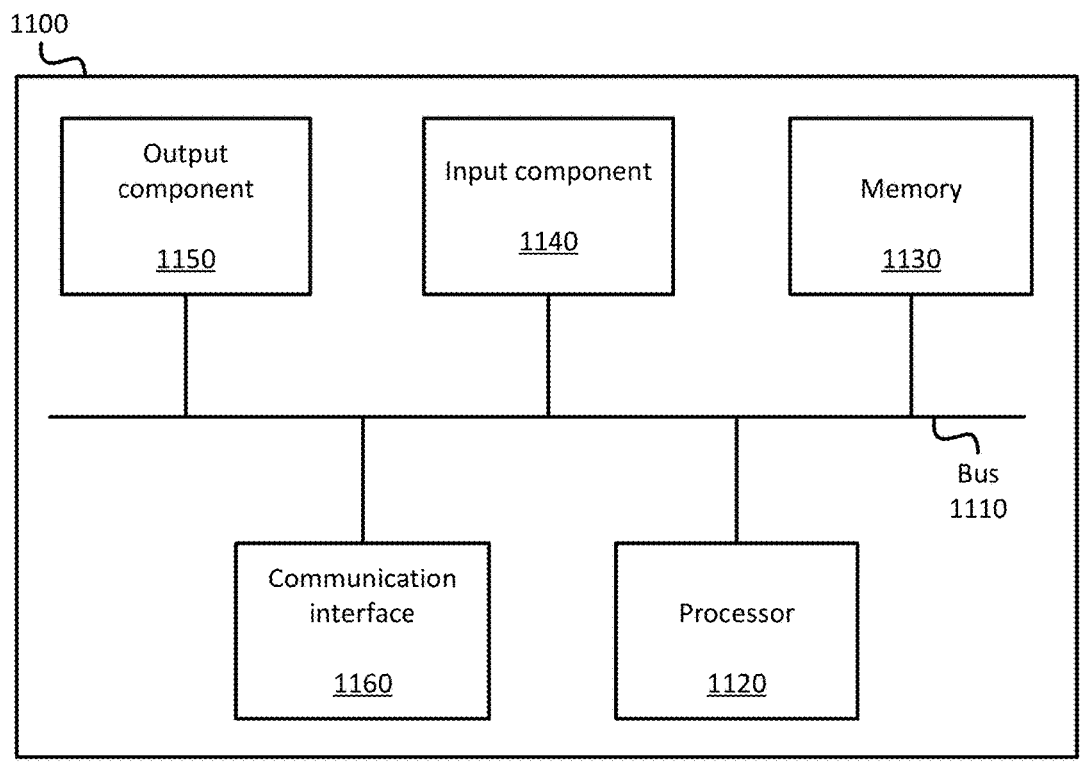
FIG. 11 illustrates example components of one or more devices, according to one or more embodiments described herein.

FIG. 11 is a diagram of example components of device 1100. Device 1100 may be used to implement certain of the devices or systems described above (e.g., PON integrated tool 100, UE 720, and PON service provider 740). Device 1100 may include bus 1110, processor 1120, memory 1130, input component 1140, output component 1150, and communication interface 1160. In another implementation, device 1100 may include additional, fewer, different, or differently arranged components.

Bus 1110 may include one or more communication paths that permit communication among the components of device 1100. Processor 1120 may include a processor, microprocessor, or processing logic that may interpret and execute instructions. Memory 1130 may include any type of dynamic storage device that may store information and instructions for execution by processor 1120, and/or any type of non-volatile storage device that may store information for use by processor 1120.

Input component 1140 may include a mechanism that permits an operator to input information to device 1100, such as a keyboard, a keypad, a button, a switch, etc. Output component 1150 may include a mechanism that outputs information to the operator, such as a display, a speaker, one or more light emitting diodes ("LEDs"), etc.

Communication interface 1160 may include any transceiver-like mechanism that enables device 1100 to communicate with other devices and/or systems. For example, communication interface 1160 may include an Ethernet interface, an optical interface, a coaxial interface, or the like. Communication interface 1160 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1100 may include more than one communication interface 1160. For instance, device 1100 may include an optical interface and an Ethernet interface.

Device 1100 may perform certain operations relating to one or more processes described above. Device 1100 may perform these operations in response to processor 1120 executing software instructions stored in a computer-readable medium, such as memory 1130. A computer-readable medium may be defined as a non-transitory memory device. A memory device may include space within a single physical memory device or spread across multiple physical memory devices. The software instructions may be read into memory 1130 from another computer-readable medium or from another device. The software instructions stored in memory 1130 may cause processor 1120 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of blocks and/or signals have been described with regard to FIGS. 6, 7, and 9, the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described m conjunction with thresholds. The term "greater than" (or similar terms), as used herein to describe a relationship of a value to a threshold, may be used interchangeably with the term "greater than or equal to" (or similar terms) Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device comprising:
   a first pair of pass-through fiber connection adapters;
   a second fiber connection adapter;
   a non-transitory computer-readable medium storing a set of processor-executable instructions; and
   one or more processors configured to execute the set of processor-executable instructions, wherein executing the set of processor-executable instructions causes the one or more processors to:
      measure power of signaling that is received at a first adapter of the pair of pass-through fiber connection adapters from a first fiber link connected to the first adapter, and that is passed through to a second fiber link connected to a second adapter of the pair of pass-through fiber connection adapters;
      present, based on the measured power, an indication of whether the measured power is within a first range of values, the presenting including:
         presenting a first indication when the measured power is within the first range of values, and
         presenting a second indication when the measured power is outside the first range of values;
      measure signal loss on an inactive fiber link connected to the second fiber connection adapter; and
      present, based on the measured signal loss of the inactive fiber link, an indication of whether the measured signal loss is within a second range of values, the presenting including:
         presenting a third indication when the measured signal loss is within the second range of values, and
         presenting a fourth indication when the measured signal loss is outside the second range of values.

2. The device of claim 1 further comprising:
   a set of inputs; and
   wherein the processor-executable instructions further include processor-executable instructions to:
      select the first range of values based on a first input from the set of inputs specifying a first passive optical network ("PON") standard; and change the first range of values based on a second input from the set of inputs specifying a second PON standard.

3. The device of claim 1, wherein the processor-executable instructions further include processor-executable instructions to:
emit one or more light pulses through the inactive fiber link via the second fiber connection adapter; and
measure light returning through the second fiber optic connection adapter in response to emitting the one or more light pulses.

4. The device of claim 1, wherein the processor-executable instructions further include processor-executable instructions to:
emit visible laser light through the inactive fiber link via the second fiber connection adapter.

5. The device of claim 4 further comprising:
a laser diode coupled to the second fiber connection adapter.

6. The device of claim 1 further comprising:
a third fiber connection adapter;
a fiber inspection probe with an interface to the third fiber connection adapter; and
wherein the processor-executable instructions further include processor-executable instructions to:
detect, using the fiber inspection probe, an abnormality about an end or connector of a fiber link connected to the third fiber connection adapter.

7. The device of claim 1 further comprising:
a first indicator illuminating with one of a plurality of colors based on measured power of signaling at a first wavelength corresponding to an upstream channel of a PON standard; and
a second indicator illuminating with one of the plurality of colors based on measured power of signaling at a different second wavelength corresponding to a downstream channel of the PON standard.

8. The device of claim 1 further comprising:
a first indicator illuminating with one of a plurality of colors based on measured power of signaling at a first wavelength corresponding to a channel of a first PON standard;
a second indicator illuminating with one of the plurality of colors based on measured power of signaling at a different second wavelength corresponding to a channel of a different second PON standard.

9. The device of claim 1 further comprising:
a wireless radio; and
wherein the processor-executable instructions further include processor-executable instructions to:
wirelessly transfer results from measuring the power and the signal loss to a remote user equipment ("UE") using the wireless radio.

10. The device of claim 1 further comprising:
a set of inputs; and
wherein the processor-executable instructions further include processor-executable instructions to:
select the first range of values based on a first input from the set of inputs specifying testing from a first PON device or PON location; and
change the first range of values based on a second input from the set of inputs specifying testing from a different second PON device or PON location.

11. The device of claim 1 further comprising:
a tap on a link over which signaling passes between the first adapter and the second adapter of the first pair of pass-through fiber connection adapters, the tap configured to detect the power of the signaling without disrupting the signaling passing between the first adapter and the second adapter.

12. A non-transitory computer-readable medium, storing a set of processor-executable instructions, which, when executed by one or more processors, cause the one or more processors to:
measure power of signaling that is received at a first adapter of a pair of pass-through fiber connection adapters from a first fiber link connected to the first adapter, and that is passed through to a second fiber link connected to a second adapter of the pair of pass-through fiber connection adapters;
present, based on the measured power, an indication of whether the measured power is within a first range of values, the presenting including:
presenting a first indication when the measured power is within the first range of values, and
presenting a second indication when the measured power is outside the first range of values;
measure signal loss on an inactive fiber link connected to a second fiber connection adapter; and
present, based on the measured signal loss of the inactive fiber link, an indication of whether the measured signal loss is within a second range of values, the presenting including:
presenting a third indication when the measured signal loss is within the second range of values, and
presenting a fourth indication when the measured signal loss is outside the second range of values.

13. The non-transitory computer-readable medium of claim 12, wherein the processor-executable instructions further include processor-executable instructions to:
select the first range of values based on a first input specifying a first passive optical network ("PON") standard; and
change the first range of values based on a second input specifying a second PON standard.

14. The non-transitory computer-readable medium of claim 12, wherein the processor-executable instructions further include processor-executable instructions to:
illuminate a first indicator with one of a plurality of colors based on measured power of signaling at a first wavelength corresponding to an upstream channel of a PON standard; and
illuminate a second indicator with one of the plurality of colors based on measured power of signaling at a different second wavelength corresponding to a downstream channel of the PON standard.

15. The non-transitory computer-readable medium of claim 12, wherein the processor-executable instructions further include processor-executable instructions to:
illuminate a first indicator with one of a plurality of colors based on measured power of signaling at a first wavelength corresponding to a channel of a first PON standard;
illuminate a second indicator with one of the plurality of colors based on measured power of signaling at a different second wavelength corresponding to a channel of a different second PON standard.

16. The non-transitory computer-readable medium of claim 12, wherein the processor-executable instructions further include processor-executable instructions to:
select the first range of values based on a first input specifying testing from a first PON device or PON location; and change the first range of values based on a second input from the set of inputs specifying testing from a different second PON device or PON location.

17. A method comprising:

measuring power of signaling that is received at a first adapter of a pair of pass-through fiber connection adapters from a first fiber link connected to the first adapter, and that is passed through to a second fiber link connected to a second adapter of the pair of pass-through fiber connection adapters;

presenting, based on the measured power, an indication of whether the measured power is within a first range of values, the presenting including:

presenting a first indication when the measured power is within the first range of values, and presenting a second indication when the measured power is outside the first range of values;

measuring signal loss on an inactive fiber link connected to a second fiber connection adapter; and presenting, based on the measured signal loss of the inactive fiber link, an indication of whether the measured signal loss is within a second range of values, the presenting including:

presenting a third indication when the measured signal loss is within the second range of values, and presenting a fourth indication when the measured signal loss is outside the second range of values.

18. The method of claim 17, further comprising:

wirelessly transferring results from measuring the power and the signal loss to a remote user equipment ("UE").

19. The method of claim 17, further comprising:

emitting one or more light pulses through the inactive fiber link via the second fiber connection adapter; and measuring light returning through the second fiber optic connection adapter in response to emitting the one or more light pulses.

20. The method of claim 17, further comprising:

emitting visible laser light through the inactive fiber link via the second fiber connection adapter.

\* \* \* \* \*